United States Patent
Bhola et al.

(10) Patent No.: US 9,946,988 B2
(45) Date of Patent: Apr. 17, 2018

(54) MANAGEMENT AND NOTIFICATION OF OBJECT MODEL CHANGES

(75) Inventors: Saurabh Bhola, Drogheda (IE); Gary Denner, Longwood (IE); Paula M. Keohan, Dungarvan (IE); Michael J. Loughran, Dublin (IE); John Meade, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 540 days.

(21) Appl. No.: 13/247,609

(22) Filed: Sep. 28, 2011

(65) Prior Publication Data
US 2013/0080349 A1    Mar. 28, 2013

(51) Int. Cl.
*G06Q 10/06* (2012.01)
*G06Q 10/10* (2012.01)
*H04L 12/58* (2006.01)

(52) U.S. Cl.
CPC ......... *G06Q 10/067* (2013.01); *G06Q 10/107* (2013.01); *H04L 51/14* (2013.01)

(58) Field of Classification Search
CPC .................................................. G06Q 10/067
USPC ................................................ 705/7.11, 348
See application file for complete search history.

(56) References Cited

U.S. PATENT DOCUMENTS

| | | | |
|---|---|---|---|
| 5,133,075 A * | 7/1992 | Risch | |
| 6,292,803 B1 * | 9/2001 | Richardson et al. | 707/610 |
| 6,393,386 B1 * | 5/2002 | Zager et al. | 703/25 |
| 6,424,354 B1 * | 7/2002 | Matheny et al. | 345/619 |
| 6,477,548 B1 | 11/2002 | Nihei | |
| 6,496,202 B1 * | 12/2002 | Prinzing | 715/762 |
| 6,643,668 B2 | 11/2003 | Sluiman | |
| 6,721,740 B1 * | 4/2004 | Skinner et al. | |
| 6,725,445 B1 * | 4/2004 | Leymann et al. | 717/101 |
| 7,010,793 B1 * | 3/2006 | Chatterjee et al. | 719/316 |

(Continued)

FOREIGN PATENT DOCUMENTS

EP    1299973 A1 *    4/2003    ............ H04L 12/24

OTHER PUBLICATIONS

Kowalczykiewicz, K. and Weiss, D., "Traceability: Taming Uncontrolled Change in Software Development", Presented 2002, Retrieved at http://citeseerx.ist.psu.edu/viewdoc/download?doi=10.1.1.19.8922&rep=rep1&type=pdf on Sep. 22, 2013, pp. 10.*

(Continued)

*Primary Examiner* — Jan P Mincarelli
(74) *Attorney, Agent, or Firm* — Patterson + Sheridan, LLP

(57) ABSTRACT

Techniques are disclosed for managing development of a model set comprised of one or more object models by a plurality of model developers. Each model developer may be considered an interested party. For example, when a model developer changes an area of the model, that person becomes the most interested party in other changes made to the same area. An automated mechanism is provided to track changes made to the model set and informs interested parties as changes are made or after changes are made to the model based on a weighting system. In one embodiment, the weighting system may be based on a distance from the changed portions and on the amount of time since a party last made a change to the same area.

15 Claims, 5 Drawing Sheets

(56) References Cited

U.S. PATENT DOCUMENTS

| | | | |
|---|---|---|---|
| 7,216,088 B1* | 5/2007 | Chappel | G06Q 10/063118 705/7.17 |
| 7,272,815 B1* | 9/2007 | Eldridge et al. | 717/101 |
| 7,373,388 B2* | 5/2008 | Leukert-Knapp et al. | 709/207 |
| 7,596,620 B1 | 9/2009 | Colton et al. | |
| 7,676,483 B2 | 3/2010 | Klug | |
| 7,694,115 B1 | 4/2010 | Porras et al. | |
| 7,698,276 B2* | 4/2010 | Seshadri et al. | 719/318 |
| 8,224,821 B2* | 7/2012 | Graham et al. | 707/736 |
| 8,250,202 B2* | 8/2012 | Kaminsky et al. | 709/224 |
| 8,260,642 B2* | 9/2012 | Bahrs | G06Q 10/00 705/319 |
| 8,438,178 B2* | 5/2013 | Ismalon | 707/765 |
| 8,512,150 B2* | 8/2013 | Herrmann et al. | 463/43 |
| 8,606,615 B2* | 12/2013 | Milden et al. | 705/7.27 |
| 8,606,792 B1* | 12/2013 | Jackson et al. | 707/748 |
| 8,789,009 B2* | 7/2014 | Lee et al. | 717/104 |
| 2003/0061330 A1 | 3/2003 | Frisco et al. | |
| 2003/0131028 A1 | 7/2003 | Radi et al. | |
| 2003/0167443 A1* | 9/2003 | Meunier | G06F 17/30899 715/255 |
| 2003/0204517 A1* | 10/2003 | Skinner | G06F 9/542 |
| 2003/0225840 A1* | 12/2003 | Glassco et al. | 709/206 |
| 2003/0226109 A1* | 12/2003 | Adamson et al. | 715/513 |
| 2004/0123234 A1* | 6/2004 | Anderson et al. | 715/513 |
| 2004/0133670 A1* | 7/2004 | Kaminsky et al. | 709/224 |
| 2005/0075917 A1* | 4/2005 | Flores et al. | 705/8 |
| 2005/0262488 A1 | 11/2005 | Wagner et al. | |
| 2005/0278209 A1* | 12/2005 | Kayahara | G06Q 10/06313 705/7.23 |
| 2007/0088603 A1* | 4/2007 | Jouppi et al. | 705/14 |
| 2007/0136449 A1 | 6/2007 | Da Palma et al. | |
| 2007/0250338 A1* | 10/2007 | Kumhyr et al. | 705/1 |
| 2008/0250392 A1* | 10/2008 | Petri | 717/120 |
| 2009/0083314 A1* | 3/2009 | Maim | 707/103 R |
| 2009/0171873 A1* | 7/2009 | Dolin et al. | 706/20 |
| 2010/0037203 A1* | 2/2010 | Limburn | G06F 8/33 717/105 |
| 2010/0169865 A1* | 7/2010 | Clemm | 717/121 |
| 2010/0211924 A1* | 8/2010 | Begel | G06F 8/74 717/101 |
| 2010/0281035 A1* | 11/2010 | Carmel et al. | 707/749 |
| 2011/0125847 A1* | 5/2011 | Cocheu | G06Q 10/10 709/204 |
| 2013/0080350 A1 | 3/2013 | Bhola et al. | |

OTHER PUBLICATIONS

Helming, J. et al., "Traceability-based Change Awareness", Model Driven Engineering Languages and Systems, Lecture Notes in Computer Science, vol. 5795, 2009, pp. 372-376, retrieved at http://wwwbruegge.informatik.tu-muenchen.de/publications/pdf/204/DashBoardNew.pdf on Sep. 20, 2013, pp. 5.*

Das, Sudipto et al., Anonymizing Weighted Social Network Graphs, 26th International Conference on Data Engineering, Mar. 2010, pp. 904-907, IEEE, Piscataway, NJ, United States.

Using Oracle Designer 6i to Configuration Management Internet Platform Applications: An Oracle Technical White Paper, Oct. 2000, pp. 1-10, Oracle, Redwood Shores, CA, United States.

Moriarty, Terry, How System Architect Measures Up, The Data Administration Newsletter, LLC, Nov. 1, 2002, <http://www.tdan.com/view-featured-columns/5439>.

Feature Matrix, Embarcadero ER/Studio XE, 2009, Embarcadero Technologies, Inc., San Francisco, CA, United States.

Sparx Systems, Version Control Best Practices for Enterprise Architect, Sparx Systems White paper Repository, 2010, pp. 1-17, Sparx Systems, Creswick, Victoria, Australia.

CA ERwin Model Manager, Product Brief: CA Erwin Model Manager, 2009, pp. 1-8, CA technologies, Islandia, NY, United States.

Das, Sudipto et al., Anonymizing Edge-Weighted Social Network Graphs, 26th International Conference on Data Engineering, 2010, Piscataway, NJ, United States.

Using Oracle Designer 6i to Configuration Management Internet Platform Applications: An Oracle Technical White Paper, Oct. 2000, pp. 1-12, Oracle, Redwood Shores, CA, United States.

Moriarty, Terry, How System Architect Measures Up, The Data Administration Newsletter, LLC, Nov. 1, 2002, <http://www.tdan.com/view-featured-columns/5439>. [Available Online].

Matrix, Embarcadero Er/Studio XE, 2009, Embarcadero Technologies, Inc., San Francisco, CA, United States.

SPARX SYSTEMS. Version Control Best Practices for Enterprise Architect. SPARX SYSTEMS White paper Repository, 2010, pp. 1-17, SPARX SYSTEMS, Creswick, Victoria, Australia.

CA ERwin Model Manager, Product Brief: CA Erwin Model Manager, 2009, pp. 1-6, CA technologies, slandia, NY, United States.

Flelming, J. et al., "Traceability-based Change Awareness", Model Driven Engineering Languages and Systems, Lecture Notes in Computer Science, vol. 5795, 2009, pp. 372-376, retrieved at http://wwwbruegge.informatik.tu-muenchen.de/publications/pdf/204/DashBoardNew.pdf on May 1, 2017, pp. 20.

Kowalczykiewicz, K. and Weiss, D., "Traceability: Taming Uncontrolled Change in Software Development", Presented 2002, Retrieved at http://citeseerx.ist.psu.edu/viewdoc/download?doi=1 0.1.1.19.8922&rep=rep1 &type=pdf on May 1, 2017, p. 10.

* cited by examiner

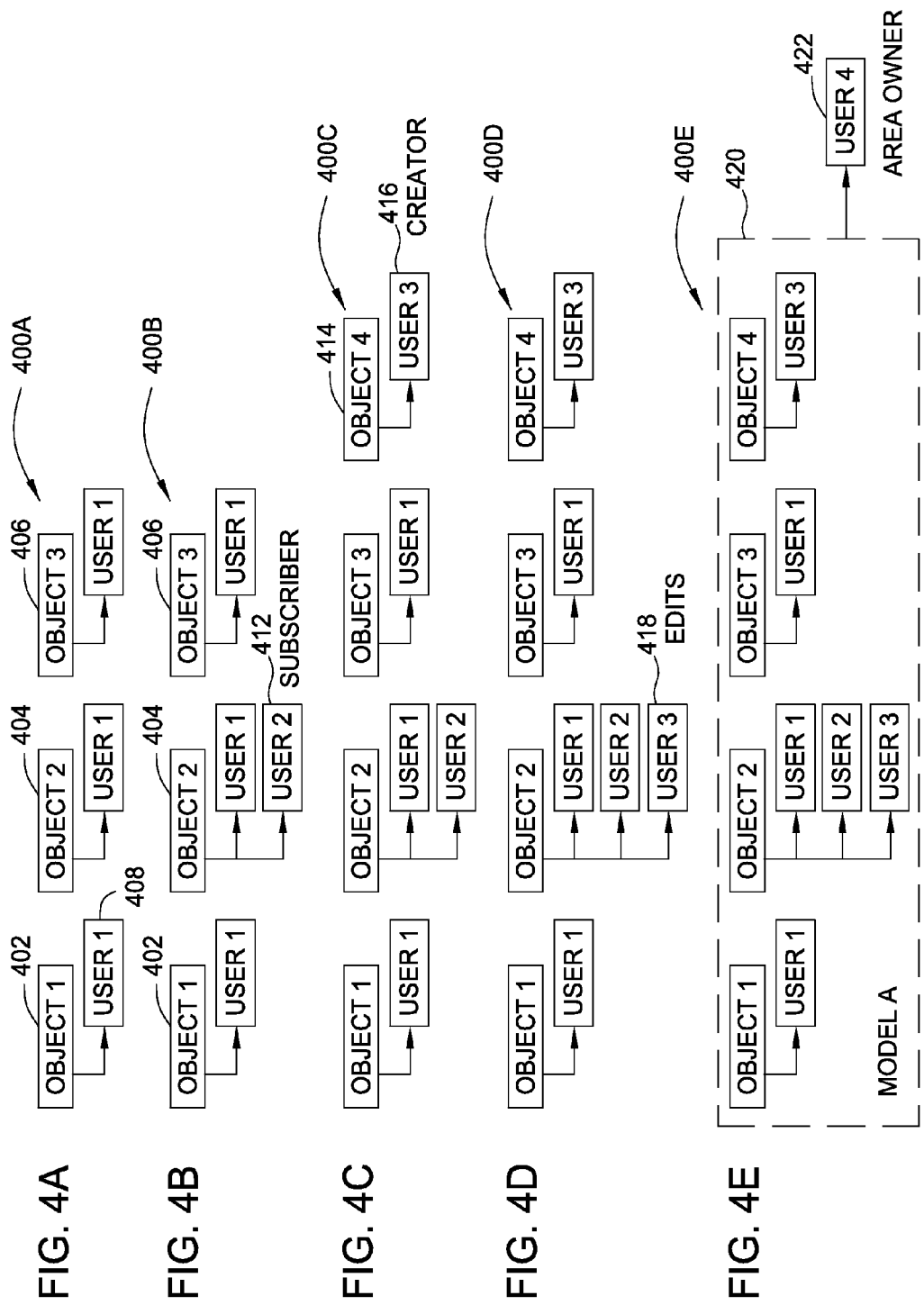

OBJECT HISTORY 500

| | Actor 502 | Action 504 | Changed 506 | Changed Datetime 508 | Revision Changeset 510 |
|---|---|---|---|---|---|
| 512₁ | User1 | CREATE | ModelA | 2011-09-06 09:12 | r20158912 |
| 512₂ | User1 | CREATE | Object1 | 2011-09-06 09:12 | r20158912 |
| 512₃ | User1 | CREATE | Object2 | 2011-09-06 09:12 | r20158912 |
| 512₄ | User1 | CREATE | Object3 | 2011-09-06 09:12 | r20158912 |
| 512₅ | User1 | CREATE | Object4 | 2011-09-06 09:12 | r20158912 |
| 512₆ | User3 | MODIFY | Object2 | 2011-10-08 16:00 | r20158913 |
| 512₇ | User3 | CREATE | Object4 | 2011-10-08 17:31 | r20158914 |

}  512

RELATIONSHIPS 550

| | User 522 | ModelElement 524 | Role 526 | Relationship Datetime 528 | Weight 530 |
|---|---|---|---|---|---|
| 534₁ | User1 | ModelA | Creator | 2011-09-06 09:12 | 1.00 |
| 534₂ | User2 | Object2 | Subscriber | 2011-09-07 11:52 | 1.00 |
| 534₃ | User3 | Object2 | Editor | 2011-10-08 16:00 | 0.68 |
| 534₄ | User3 | Object4 | Creator | 2011-10-08 16:00 | 1.00 |
| 534₅ | User4 | ModelA | Area Owner | 2011-09-26 09:00 | 1.00 |

MANAGEMENT AND NOTIFICATION OF OBJECT MODEL CHANGES

BACKGROUND

Object models are utilized by enterprise organizations to represent information and processes utilized in conducting business. Business models may be constructed to encapsulate a business' objectives, operations, and practices. Data models, a particular kind of object model, are used to represent the information produced and/or consumed by software. Data models may be organized into several types of object models, such as logical data models, which represent information on an abstract level, and physical data models, which represent information more concretely in database-specific implementations. Process models, another type of object model, may be used to represent particular tasks and procedures of a business enterprise, and may include service-oriented architecture models and service models.

Object models are generally created by a large team that generally includes business analysts, data architects, and software developers. A business analyst understands the business context in which the object models are to be utilized and may create a business model that forms the basis for data models. A data architect is a member of technical staff that designs and creates the logical models and/or physical models based on the business models determined by the business analyst. Finally, a software developer is another member of the technical staff that develops a specific implementation of the data models, for example, in the form of relational database query language, and writes logical code for interfacing the data model in one or more software applications for use in the business enterprise.

As the object models may include many inter-related model elements, one team member's work may affect another's previous or current efforts. This may result in errors as team members having different areas of expertise may introduce errors to parts of the model in which they are not an expert. As such, there is a need for methods and techniques for managing and coordinating model development in a distributed development environment.

SUMMARY

Embodiments of the invention provide a method, product and system for managing development of a model set comprised of one or more object models by a plurality of users. The operation includes determining one or more model relationships for a model set having a plurality of model elements. Each model relationship connects a first model element to a second model element of the plurality of model elements. The operation further includes receiving, from a first user, change information for a changed model element, the changed model element being one of the plurality of model elements. The operation also includes identifying one or more related model elements by traversing, from the changed model element, other model elements via the model relationships; and identifying, for each identified related model element, one or more interested users having a past interaction with the identified related model element. The operation further includes determining, for each interested user, a weighted relationship between the interested user and the changed model element. The weighted relationship is based on the past interaction with the identified related model element and based on the model relationship between the identified related model element and the changed model element. The operation finally includes generating a change notification to each of the interested users based on their corresponding weighted relationship.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIGS. 4A, 4B, 4C, 4D, and 4E illustrate a mapping between model elements and a plurality of users, according to one embodiment of the invention.

FIG. 5 illustrates exemplary database records tracking object history and relationships between model elements and users, according to one embodiment of the invention.

DETAILED DESCRIPTION

Figure 1:
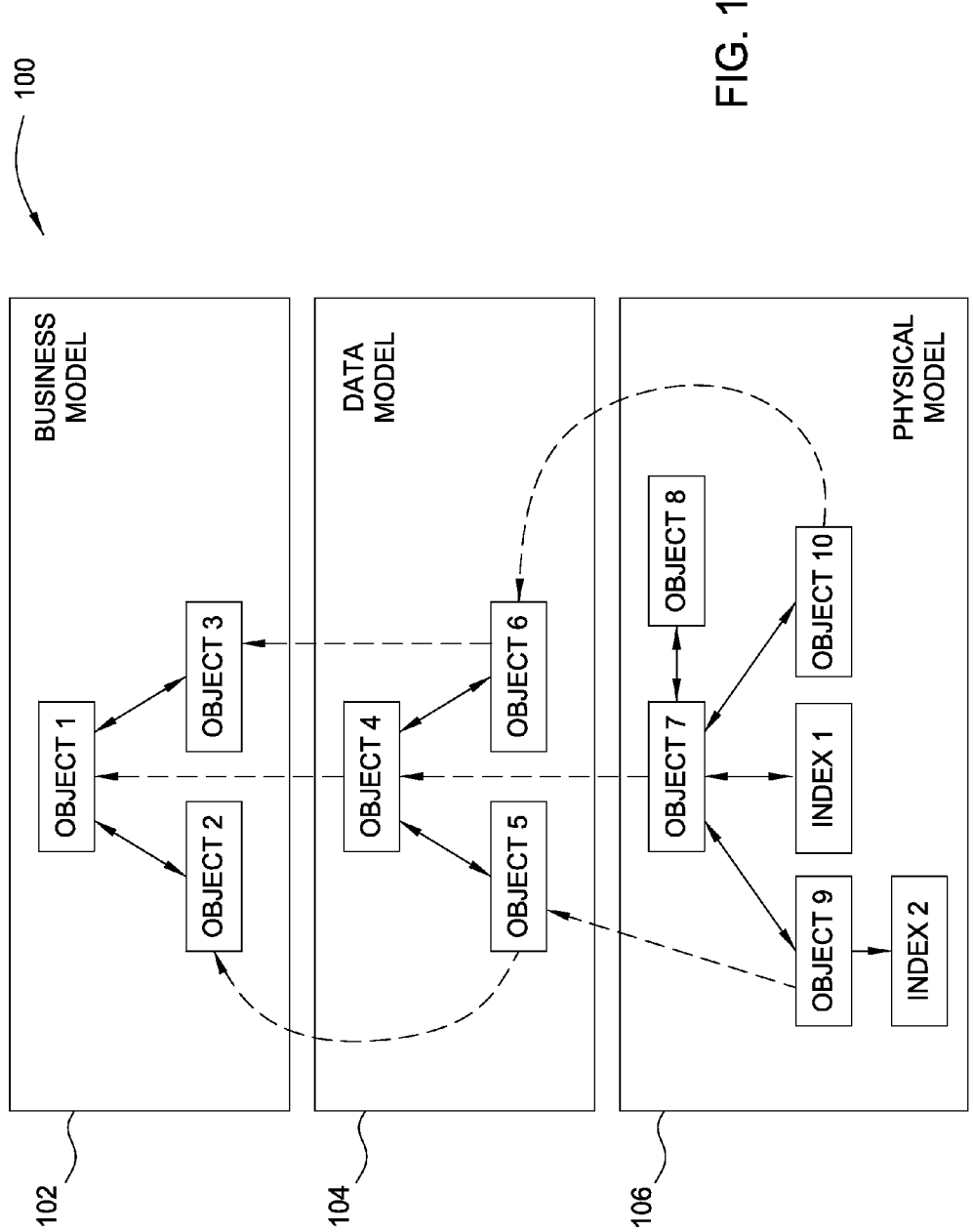
FIG. 1 is a block diagram illustrating a model stack and relationships between models, according to one embodiment of the invention.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a DBMS) or related data available in the cloud. For example, the DBMS could execute on a computing system in the cloud and provide access to one or more tables. The one or more tables may be stored at a storage location in the cloud. Doing so allows the one or more tables to be accessed from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Overview of Description

Object models utilized by enterprises may be large and frequently have numerous team members working on disparate sections of the object models. Further, rather than being created from scratch, object models are usually products of years of development and expertise. As such, given their complexity and size, it would be difficult for each person to know each area of a model, particularly for a specific industry or across numerous industries. It may also be difficult for a person to stay coordinated with other developers to know what each team member has been working on. As such, parties may introduce errors to parts of a model in which they are not an expert.

Accordingly, to minimize the impact of such errors and to catch such errors as early as possible in a development process, embodiments of the invention provide a mechanism for notifying model developers of changes to elements of a model in which they may be interested. In one embodiment, embodiments of the invention provide a mechanism for notifying a model developer when a party changes part of a model which has been previously changed and/or originally worked on by the model developer. Notifications may be sent to all interested parties or may be sent to parties having a threshold level of interest. In one embodiment, a weighting system may be utilized to determine a party's level of interest based on the party's previous interactions with the model. For example, the weighting system may de-emphasize interest of a party based on the recency of the party's changes to an area of the model. As compared to conventional model development environments, embodiments of the invention advantageously maintain object model integrity and ensure changes to one part of an object model do not conflict and/or make incompatible with another part of the object model.

Discussion will begin with a description of an example object model having multiple layers of abstraction. An example system for managing model development will then be described that utilizes a notification mechanism according to embodiments of the invention. Discussion will then turn to an example method for notifying interested parties based on a weighting system according to embodiments described herein. Finally, an example will be described of several parties changing elements of an object model and being notified according to embodiments of the invention will be described.

Example Object Model Stack

Discussion of various embodiments of the invention may herein refer to an "object model". An object model generally refers to a conceptual or semantic schema that represents information, processes, and relationships of a system, such as a business or organization. Object models may be created by identifying, describing, and structuring the business functions, data, and processes typically found in large organizations in such a way that may be utilized by information technology (IT) and other technical projects. These object models may ensure that business requirements for major initiatives are captured and expressed in a manner suitable for technical staff and may be integrated in various levels of subsequent application development.

Discussion of embodiments of the invention may also refer to a "model element" or "model object", which is a term used herein to refer to any component of an object model, including but not limited to, an entity, attribute and/or parameter, attribute value, tuple, table, column, row, the object model itself, a model set, and/or a package of object models.

FIG. 1 is a block diagram illustrating an example model stack 100 having a plurality of models and relationships between the models, according to one embodiment of the invention. As shown, the model stack 100 includes a business model 102, a data model 104, and a physical model 106. While the embodiment shown in FIG. 1 includes business model 102, data model 104, and physical model 106, it is understood that various other suitable models may be used in the model stack 100, including, but not limited to, conceptual models, data warehouse models, process models, and services models.

The model stack 100 includes a plurality of models 102, 104, and 106 that include a plurality of model elements that may be correlated and interdependent such that the elements in the models 102, 104, and 106 correspond across various levels of abstraction. In the example shown, model stack 100 is illustrated as a directed graph such that solid directional lines within each of the models 102, 104, 106 indicate relationships between elements within a model, while dashed directional lines represent relationships between elements between models. When a model element of the models 102, 104, and 106 is modified, any model element within the same model related to the modified model element may have to be changed accordingly, such that the model elements remain consistent. Further, when a model element of one of the models 102, 104, and 106 is modified, any model elements, including those model elements in other models 102, 104, 106, corresponding to or associated with the modified model element may have to be modified accordingly, such that the models remain consistent.

As shown, the business model 102 may include one or more objects (identified as "Object 1", "Object 2", and "Object 3") that represent business objectives and enterprise-wide definitions of concepts and data. The data model 104 may include one or more objects (identified as "Object 4", "Object 5", "Object 6") that represent a logical schema for storing information and data utilized by an organization as indicated by the business model 102. In one embodiment, the objects of the data model 104 may be associated with each other based on one or more attributes. As shown, the model objects of the data model 104 may correspond to the model objects of the business model 102 as depicted by the dashed directional lines. Further, the attributes of the data model 104 may correspond with attributes of the objects of the business model 102. While FIG. 2 depicts of the model objects of the business model 102 and the data model 104 as having a one-to-one relationship, it is appreciated that other configurations may be utilized, such as a plurality of model objects in the data model 104 representing a single model object in the business model 102, or vice versa.

Finally, the physical model 106 includes one or more objects (identifies as "Object 7", "Object 8", "Object 9", "Object 10", "Index 1", and "Index 2") that represent a physical implementation of the data model 104 within storage, for example, as in a relational database. In the example shown, the physical model 106 describes a relational database having a plurality of tables (e.g., "Object 7", "Object 8", "Object 9", "Object 10") for storing data of the data model 104. The tables may be associated with each other by one or more columns. The physical model may further include means for (e.g., "Index 1", "Index 2") quickly accessing data in the relationship database. The tables and/or columns of the physical model 106 may correspond with the model objects of the data model 104 and business model 102.

Example System for Model Development

Figure 2:
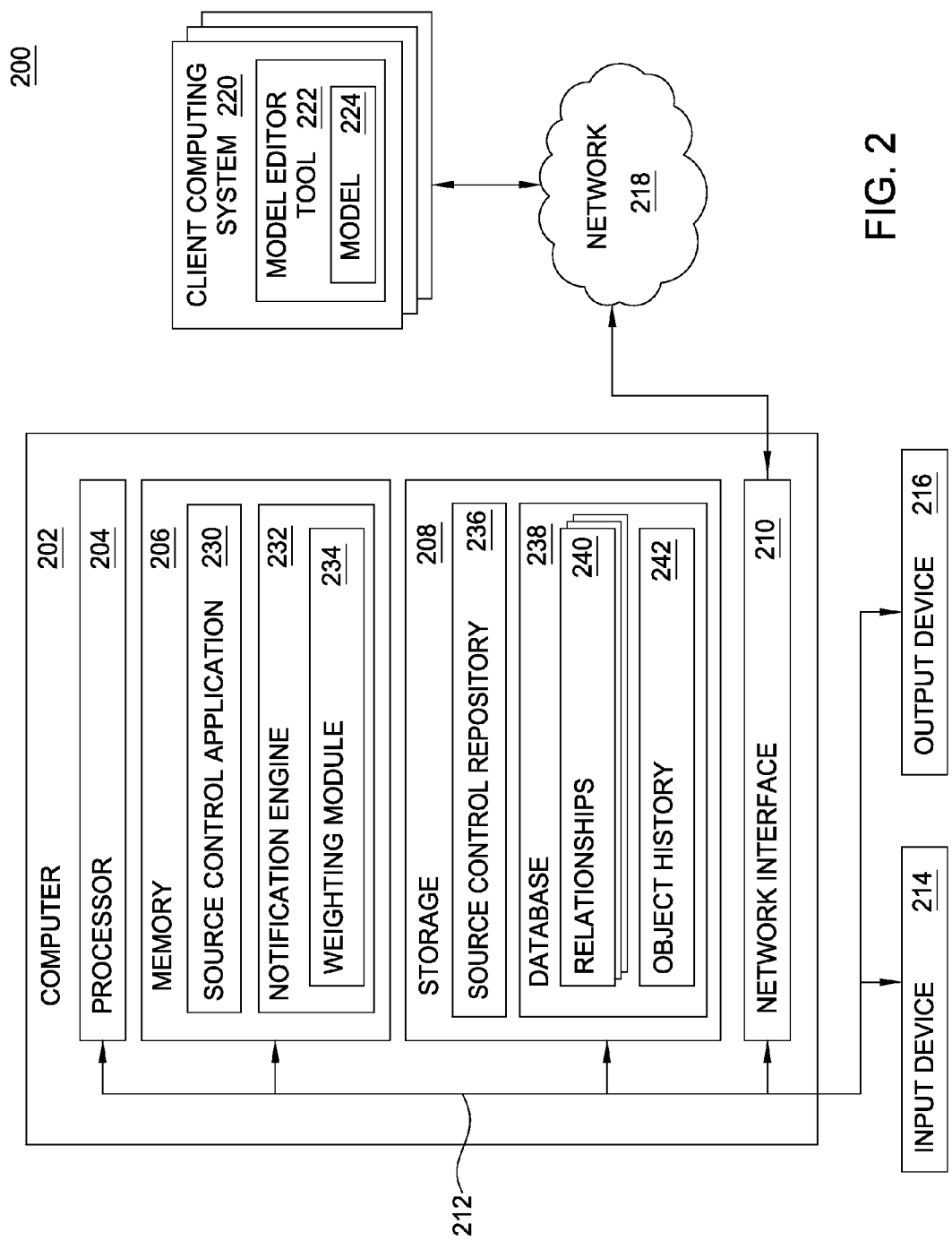
FIG. 2 is a block diagram illustrating a system for notifying model developers based on a weighting system, according to one embodiment of the invention.

FIG. 2 is a block diagram illustrating a system 200 for model development, according to one embodiment of the invention. As shown, the networked system 200 includes a server 202 communicatively connected to one or more client computing systems 220 via a network 218. In general, the network 218 may be a telecommunications network and/or a wide area network (WAN). In a particular embodiment, the network 218 is the Internet.

The client computing system 220 includes a model editor tool 222 configured to create and modify an object model 224. Generally, the model editor tool 222 may be a software application or a suite of software applications that enable a user to develop an object model 224 representing data and processes of a business organization. In one embodiment, the model editor tool 222 may be configured to express the object model 224 in one or more modeling paradigms, such as Entity-Relationship (E-R) modeling. While embodiments of the invention may be discussed herein under an E-R paradigm for clarity, it is understood that embodiments of the invention may be utilized with other suitable frameworks and/or languages, such as Unified Modeling Language (UML), Eclipse Modeling Framework (EMF), and Service-Oriented Architecture Modeling Framework (SoaML). The model editor tool 222 may display the object model 224 in a graphical view, such as a directed graph, or in a text view, such as a text document. In one implementation, the model editor tool 222 may display the object model 224 as an extensible Markup Language (XML) document or other suitable document format. In one embodiment, the model editor tool 222 may be an integrated development environment (IDE), such as Eclipse.

In one embodiment, the model editor tool 222 may be configured to modify a container object, sometimes referred to as a "model set" or "package", which may include a plurality of object models 224. For sake of clarity, description of embodiments of the invention may refer to modifying and/or managing a model, but it is appreciated that the embodiments of the invention also include modifying a package and the plurality of interrelated models contained therein. For example, while embodiments of the invention are described as providing revision control to an object model, it is contemplated that embodiments of the invention may utilize revision control for an entire package, which may include a plurality of object models, interrelated and/or unrelated.

In one embodiment, the model editor tool 222 may be configured to connect to the server 202 to interact with a source control system (such as the source control application 230 of server 202) to receive object models for local modification and transmit object models for saving to the source control system.

In one embodiment, the model editor tool 222 may be configured to receive one or more notifications from the server 202 (such as from the notification engine 232), indicating a pending change being made by another client computing system 220. In another embodiment, the model editor tool 222 may be configured to periodically poll a central messaging queue for notifications addressed to the client computing system 220 on which the model editor tool 222 is executed. The model editor tool 222 may be configured to present the one or more notifications, which are described in further detail below, to a user of the model editor tool 222 in real-time. In one embodiment, the model editor tool 222 may be configured to present a real-time notification as a modal window, dialog box, alert dialog, and/or other suitable graphical interface elements, such as a pop-up alert. In another embodiment, the model editor tool 222 may present the notification as part of a workflow wizard configured to instruct a user to select one or more actions responsive to the notification, such as approval of the pending changes.

The server 202 generally includes a processor 204 connected via a bus 212 to a memory 206, a network interface device 210, a storage 208, an input device 214, and an output device 216. The server 202 is generally under the control of an operating system. Any operating system supporting the functions disclosed herein may be used. The processor 204 is included to be representative of a single CPU, multiple CPUs, a single CPU having multiple processing cores, and the like. Similarly, the memory 206 may be a random access memory. While the memory 206 is shown as a single identity, it should be understood that the memory 206 may comprise a plurality of modules, and that the memory 206 may exist at multiple levels, from high speed registers and caches to lower speed but larger DRAM chips. The network interface device 210 may be any type of network communications device allowing the server 202 to communicate with other computers via the network 218.

The storage 208 may be a persistent storage device. Although the storage 208 is shown as a single unit, the storage 208 may be a combination of fixed and/or removable storage devices, such as fixed disc drives, solid state drives, floppy disc drives, tape drives, removable memory cards or optical storage. The memory 206 and the storage 208 may be part of one virtual address space spanning multiple primary and secondary storage devices.

The input device 214 may be any device for providing input to the server 202. For example, a keyboard and/or a mouse may be used. The output device 216 may be any device for providing output to a user of the server 202. For example, the output device 216 may be any conventional display screen or set of speakers. Although shown separately from the input device 214, the output device 216 and input device 214 may be combined. For example, a display screen with an integrated touch-screen may be used.

The memory 206 of the server 202 includes a source control application 230 configured to track changes to models, such as object model 224, and a notification engine 232 configured to notify model developers of the changes in which they may be interested. Notifications may be sent to all interested parties or may be sent to parties having a threshold level of interest. The notification engine 232 includes a weighting module 234 configured to determine a weighted level of interest for model developers in a particular set of changes to the models. The source control application 230 provides control over changes to the model and enables a plurality of users to modify the same models. In one embodiment, the source control application 230 tracks changes to one or more computer documents representing an object model. For example, the source control application 230 may manage changes to a plurality of XML documents describing an object model therein.

The storage 208 of the server 202 includes a source control repository 236 configured to maintain a record of versions and/or changes between the revisions (hereinafter referred to as "revisions") to one or more models, using version control techniques known in the art. The storage 208 of the server 202 further includes a database 238 having a plurality of relationships 240 representing a mapping between users, models, model elements that comprise the models, and relationships that exist between the model elements.

The source control repository 236 may be stored as a plurality of files and directories or may be implemented in a relational database, such as the database 238 described below. The storage 208 of the server 202 further includes a database 238 that stores a plurality of relationships 240 between model elements and users and an object history 242 of changes made to the object model. In the embodiment shown, the database 238 is configured to store a map between users, models, model elements that comprise the models, and relationships that may exist between the model elements.

In one embodiment, the source control application 230 may provide a version of the object model in response to a request from a computing client, such as the model editor tool 222. The source control application 230 may provide a portion of the object model for a user and grant an exclusive lock to that user to modify that portion of the object model (sometimes referred to as "check out"). The source control application 230 may provide changes to an object model to a user to synchronize a version of the object model with a local working copy of the user (sometimes referred to as an "update"). The source control application 230 may receive changes to an object model from a connected computing client to save into the source control repository 236 (sometimes referred to as "commit" or "check in"). The source control application 230 stores each revision in the source control repository 236, along with additional metadata, such as an identity of the user responsible for the commit, a timestamp of the revision, and a unique identifier associated with the revision (referred to as a "revision number"). The source control application 230 may request duplication of a version of one or more model objects into a separate copy (referred to as a "branch") such that the modifications to the original copy (sometimes referred to as a "trunk") may be performed in parallel to modifications to the branch. The source control application 230 may also mark (sometimes referred to as "tag") a version of one or more model objects with one or more metadata labels, for example, to denote milestone or approved versions of the model element (e.g., "version 2.0214").

In one embodiment, upon receiving a commit from a user, the source control application 230 may communicate with a notification engine 232 to notify one or more users of the pending changes. In one embodiment, the notification engine 232 may be registered with the source control application 230 such that the source control application 230 instantiates an instance of the notification engine 232 upon receiving changes from a user to the commit to the source control repository 236. For example, the notification engine 232 may be a software module, plug-in, library, hook script, and/or other suitable scripting logic having instructions to be executed by the source control application 230 at a pre-determined execution step prior to performing a commit of received changes (i.e., a "pre-commit hook"). In an alternative embodiment, the notification engine 232 may be a software application executing on the server 202 concurrently with the source control application 230. The source control application 230 and the notification engine 232 may communicate via inter-application messaging techniques known in the art or via hook scripts as described above. In yet another embodiment, the model editor tool 222 of the client computing system 220 may be configured to connect directly to the notification engine 232 of the server 202 to perform a notification of users to changes made to a model, in real-time, before the changes are submitted to the source control application 230 for a commit to the source control repository 236.

As described above, upon receiving an indication of changes pending in an object model, the notification engine 232 is configured to determine a plurality of users to notify of pending changes to a particular model element by utilizing user-to-model-element (sometimes referred to as "user relationships") and model-element-to-model-element relationships (sometimes referred to as "model relationships"), such as provided by relationships 240, described later, and a weighting mechanism, such as provided by the weighting module 234. In one embodiment, the notification engine 232 selects the plurality of users to be notified based on whether relationships to a modified model element have a weight surpassing a predetermined threshold value. The predetermined threshold value represents a threshold level of interest that a user should have in a modification to an object model in order to be notified of such modification. As such, while conventional techniques may alert any user that previously modified a model, embodiments of the invention advantageously provide a weighting mechanism that reduces irrelevant interruptions to users while still coordinating model development between the users. In one embodiment, the predetermined threshold value may be predetermined as a configuration setting of the notification engine 232 (i.e., verbosity). In another embodiment, the threshold value may be dynamically adjusted based on a variety of factors, such as based on an aggregation of weight values of all relationships.

In at least some embodiments, the notification engine 232 may determine a plurality of users to notify of pending changes to a particular model element by utilizing an understanding of inter-model dependencies and relationships of an object model, such as provided by the relationships 240. In one embodiment, the notification engine 232 may be configured to determine that one or more model elements that are modified in set of changes are related the particular model element that a user has previously modified. Accordingly, while conventional techniques only notify users of changes on a per-file basis, embodiments of the invention provide a notification mechanism that recognizes relationships and dependencies between model objects in an object model and utilizes the relationships to notify users that may be affected by a change.

In one embodiment, the notification engine 232 determines and maintains relationships 240 representing both mappings between users and model elements and mappings that exist between the model elements. The notification engine 232 utilizes the relationships 240 to determine users to notify of received changes to a particular model element by traversing the relationships.

In one embodiment, the notification engine 232 is configured to track what changes each user makes to a model and when the changes were made. In the embodiment shown, the notification engine 232 records the tracked changes in an object history 242 stored in the database 238. The notification engine 232 may utilize the object history 242 to provide a weighting mechanism that prioritizes notification of particular users to subsequent changes to the model, as described in further detail below. The object history 242 may include records of a user, an action performed, a model element changed, and date information of the change. In one embodiment, the records of the object history 242 may each include a revision number associated with a corresponding revision in the source control repository 236.

In at least some embodiments, the notification engine 232 is configured to communicate with the source control application 230 to monitor a model being managed by the source control application 230. As described above, the notification engine 232 may associate the object history 242 with corresponding revisions from the source control repository 236. In some embodiments, in addition to recognizing intra-model and inter-model dependencies, as described below, the notification engine 232 may be configured to utilize related versions to a model in the source control repository 236 to notify interested users. Accordingly, the notification mechanism described herein may be utilized across multiple versions, or branches, if necessary, rather than just a main trunk version. In one embodiment, the notification engine 232 may receive metadata information, for example, changelog information, from the source control application 230 indicating related revisions.

In one embodiment, the notification engine 232 may notify users of changes to a corresponding, related, and/or similar portion of the model in a related version as managed by the source control repository 236. For example, a source control repository 236 may include a trunk version and one or more branched versions of a model. The notification engine 232 may determine that one or more users that have previously modified a branch version of a portion of the model should be notified of changes being made to the same portion of the model, but in the trunk version. In one embodiment, the notification engine 232 may insert metadata information into the source control repository 236 via the source control application 230 to facilitate monitoring the source control repository 236 relative to the object history 242. It is appreciated that embodiments of the invention may be extended to recognize additional source control techniques for relating one version of a model to another, including but not limited to, forks, branches, trunks, tags, merges, baselines, and imports. It is further appreciated that embodiments of the invention may be extended to notify a party interested only in changes to one particular version, or branch, of a model.

In one embodiment, the notification engine 232 is configured to monitor a model having a plurality of interrelated elements. The notification engine 232 utilizes intra-model and inter-model dependencies of an object model to determine how changes in one portion of an object model may affect a different but interrelated portion of the object model. For example, referring to the example model stack 100 of FIG. 1, the notification engine 232 may track that Object 5 of data model 104 is dependent on Object 4 in an intra-model relationship and that Object 5 is related to Object 2 of business model 102. By tracking such model element relationships, the notification engine 232 may determine that changes to Object 2 of business model 102 or Object 4 of data model 104 may affect Object 5 and may notify users interested in Object 5 of such changes.

Turning back to FIG. 2, in addition to model element relationships, the notification engine 232 is also configured to track a plurality of users and their relationships to elements of the monitored model. The notification engine 232 may determine a relationship of a user to a model element based on one or more interactions between the user and the model element. The interactions between the user and model element include, but are not limited to, creation, editing, and subscription. For example, when a user creates a new model element or modifies an existing model element, the notification engine 232 may record the relationship between user and the model element such that the notification engine 232 may later notify the user of any subsequent changes to the model element. In another example, the notification engine 232 may record a relationship when a user explicitly registers their interest in a particular model element, sometimes referred to as a user "subscribing" to a model element.

In one embodiment, each relationship determined by the notification engine 232 may include an identification of the user, an identification of the model element, date information representing recency of the interaction between the user and the model element, and a weight value (sometimes referred to simply as "weight") that represents the relevancy that changes to the model element may be for the user. The weighting module 234 determines a weight value for each relationship between a user and a model element based on a variety of factors, including but not limited to historical interactions, model relationships, version relationships, and user roles, as described herein. While discussion of embodiments of the invention focuses on calculation of the weight value as a numerical value based on historical interactions and relationship information, it is contemplated other suitable weighting techniques may be utilized to prioritize relevancy of and determine interest in changes made to an object model.

The notification engine 232 is configured to utilize the weight values to dynamically prioritize relevancy of changes to the model element for interested parties and determine which users are to be notified of the changes, as described in further detail later. In one embodiment, the weighting module 234 may dynamically adjust (i.e., increase or decrease) each weight value based on subsequent development activity in the object model. For example, where a user frequently checks-in changes to a model element, the weighting module 234 recognizes the frequent development activity as indicative of a higher level of the user's interest in the model element and consequently increases weight of the relationship between the user and the model element. Conversely, in another example, where a user has not checked-in any changes to a particular model element for an extended period of time, the weighting module 234 recognizes the inactivity as indicative of a lower level of interest and consequently decreases the weight of the relationship between the user and the model element.

In one embodiment, the weighting module 234 is configured to utilize a user's activity history indicating changes the user has made to a model element, such as provided by the object history 242, to determine a weight value for a relationship between the user and the model element. The weighting module 234 may assign a weight corresponding to an initialized level of interest when a user creates a new model element or modifies a model element for the first time. The weighting module 234 may also modify an existing weight based on subsequent activity related to the model element.

In one embodiment, based on changes to the model element made by a particular user, the weighting module 234 may increase the existing weight of the relationship between the particular user and the changed element to reflect the particular user's continued and sustained interest in the model element.

In one embodiment, based on changes by other users to a model element previously modified by a particular user, the weighting module 234 may decrease the existing weight of the relationship between the particular user and the model element (and increase the weight of the relationships between the other users and the changed model element) to reflect the particular user's loss of primacy of interest in the modified element. In another embodiment, the weighting module 234 may be configured to decrease the existing weight of a relationship between a particular user and a model element where the particular user has not modified the model element for an extended period of time.

In one embodiment, the notification engine 232 may utilize an understanding of model interdependencies and relationships, such as provided by the relationships 240, between a modified element and its related model elements to adjust additional relationships between the related model elements and the user. For example, the notification engine 232 may be configured to determine that one or more model elements that are modified in a set of changes are related a particular model element that a user previously modified. The weighting module 234 may be configured to increase the weight of the relationship between the particular user and the previously modified model element based on the inter-element relationships to reflect that a user has continued interest in the particular model element by dint of modifying the element's "neighbors", even though the user has not directly modified the particular model element.

In another embodiment, the notification engine 232 may utilize feedback responses from prior notifications, as described below, to modify weight of a relationship between a particular user and a particular model element. Responsive to receiving a feedback response from a notified user to a prior notification of a change to a particular model element, the weighting module 234 may increase the weight of a relationship between the notified user and the particular changed model element to reflect that the notified user has re-affirmed interest in the model element by responding to the notification. Similarly, the weighting module 234 may be configured to decrease the weight of a relationship between a notified user and a particular model element in cases where no feedback response to a notification has been received to reflect that the notified user may be ignoring the notifications out of disinterest.

In one embodiment, the weighting module 234 may increase or decrease the weight by a predetermined step value. The predetermined step value may be fixed or may be dynamically adjusted based on one or more feedback techniques, for example, such as hysteresis.

In addition to basing weight on what model elements a user has previously modeled, users may also explicitly register their interest in a particular model element. In one embodiment, the notification engine 232 may receive a request to notify one or more users of any changes made to one or more model elements. Responsive to receiving such a request, the notification engine 232 is configured to create a relationship 240, if none exists, between the one or more users and the indicated model elements and assigns a weight value to the relationship. For example, the notification engine 232 may receive a "subscribe" command from a client computing system 220 to request notification of a user any changes to an "Object 2" entity of a model. Similarly, the notification engine 232 may receive a request to no longer notify one or more users of any changes made to one or more model elements (e.g., an "unsubscribe" command). In one embodiment, the weighting module 234 assigns a corresponding weight value to the relationship substantially greater that weights assigned to relationships between a user and model elements that were inferred from a user's activity, as described above, to reflect that the user has expressly declared interest.

Additionally, the notification engine 232 may determine relationships between users and an object model based on one or more roles that may be assigned to a user. In one embodiment, the weighting module 234 may assign a pre-determined weight based on the one or more assigned roles. The roles may represent a set of obligations and/or responsibilities that a user may have relative to the object model or relative to other users. Example roles that are relative to an object model include but are not limited to: an data architect, who may be interested in high-level model elements, such as the business model 102, and a content developer, who may be interested in any lower-level model elements, such as the data model 104 or the physical model 106. Example roles that are relative to other users and/or a business organization's structure, includes but is not limited to: an area owner, who provides oversight over a broad area of an organization's business represented in a spanning section of an object model; a manager, who may be responsible for a plurality of users; and a peer reviewer, who may be responsible for reviewing a peer's changes, such as provided "extreme programming" techniques known in the art.

The notification engine 232 is configured to generate a notification for one or more users to be notified of a pending change to the object model, as determined above. The notification generally describes the pending change and identifies one or more model elements to be changed and a user responsible for the pending change. The notification may further explain the rationale for determining how the affected model elements were of interest to the notified user. In one embodiment, the notification may include a description of how the model elements to be changed may affect one or more model elements in which the notified user has an interest. In one embodiment, the notification may describe one or more relationships 240 between the notified user and the affected model elements. As such, while conventional techniques may provide a user with a listing of all changed files, which may not seem relevant to a user, embodiments of the invention advantageously provide a clear explanation to a user of how the pending change may be relevant to the user by utilizing the relationships described herein. In one embodiment, the notification may include a text description, a graphical view (e.g., a directed graph), and/or a combination thereof to describe the pending change, the elements involved, and any relevant relationships.

The notification engine 232 may transmit notifications to users utilizing a variety of transport mechanisms. In one embodiment, the notification engine 232 may connect to a client computing system 220 corresponding to a user to be notified and transmit the notification as a real-time alert. In another embodiment, the notification engine 232 may provide the notification to a central messaging queue (not shown) that client computing systems 220 may periodically connect and request notifications that are addressed to them. Accordingly, embodiments of the invention provide a real-time notification system to notify users in real-time of pending changes prior to or during the committal of changes to a central repository. In yet another embodiment, the notification engine 232 may be configured to generate the notification as an e-mail message addressed to an e-mail address associated with the user to be notified. The e-mail message may be transmitted to the user utilizing conventional mail transport techniques known in the art.

In at least some embodiments, the notification engine 232 may be configured to provide a feedback mechanism to the notified user. The feedback mechanism may enable a user to acknowledge a notification or approve of pending changes in a notification. In one embodiment, the notification engine 232 may be configured to receive an acknowledgement from a notified user confirming receipt of the notification. As described above, the weighting module 234 may utilize the acknowledgment to maintain or increase the weight of the relationship between the notified user and affected model element.

In at least some embodiments, the notification engine 232 may be configured to act as a gateway to the source control application 230, such that the notification engine 232 must receive approval from a notified user for a set of pending changes prior to checking in the changes to the source control application 230. In one embodiment, the notification engine 232 may be configured to receive approval messages from client computing systems 220 in response to a notification of pending changes that indicate users' review and/or approval of the pending changes. For example, notification engine 232 may receive an approval message for pending changes from a user having a manager role relative to other users and, responsive to receiving the approval, may provide the pending changes to the source control application 230. Accordingly, embodiments of the invention enable "extreme programming" techniques to be used in model development, whereby pending changes by one user must be agreed to be another user before the changes to the object model may be committed.

In embodiments utilizing notifications as a real-time alert, the model editor tool 222 may be configured to provide the notification as a modal window having functional buttons, such as "Approve", "Deny", "OK", that, when selected, may provide a feedback indication to the notification engine 232. In embodiments utilizing notification as e-mail messages, the e-mail messages may include a hyperlink or a Uniform Resource Locator (URL) to a networked resource, such as a website, that the user may access to response to the notification. In another example, the e-mail messages may include a unique reply-to email address that corresponds to the notification described therein, such that users may reply to the e-mail message to respond to the notification.

It is appreciated that a user submitting changes to a particular model element may have repeatedly modified the same model element in the past and may therefore have a highly weighted relationship to the modified model element based on the weighting mechanism described above. As such, the user would typically be selected for notification of the very same changes the user is submitting according to embodiments of the invention described above. However, in at least some embodiments, the notification engine 232 may be configured to suppress notification (i.e., not notify) of a user of changes made to a model element, where the user is responsible for the changes, regardless of whether the user may be the party most interested in the change based on the weighting mechanism described above. In one embodiment, the notification engine 232 may further be configured to instead determine whether the submitted changes may affect one or more model elements related to the modified model element (i.e., areas of the object model outside of where the changes were made). Responsive to determining the submitted changes affect model elements related to the modified model element, the notification engine 232 may notify the user submitting the changes of the affected one or more model elements. For example, a user may be notified that their changes to a data model may cause an inconsistency between a related physical model. In one embodiment, the notification engine 232 may further notify the user of the one or more users to be notified of the submitted change. Continuing the above example, the user may decide not to continue submitting their changes to a source control repository, but rather instead, coordinate additional changes with other users to maintain model integrity. Accordingly, embodiments of the invention provide a real-time feedback mechanism that makes a model developer aware of how their changes to a model may affect the integrity and consistency of the model, thereby reducing inconsistency issues and development cost.

Example Method for Managing Modeling Development

Figure 3:
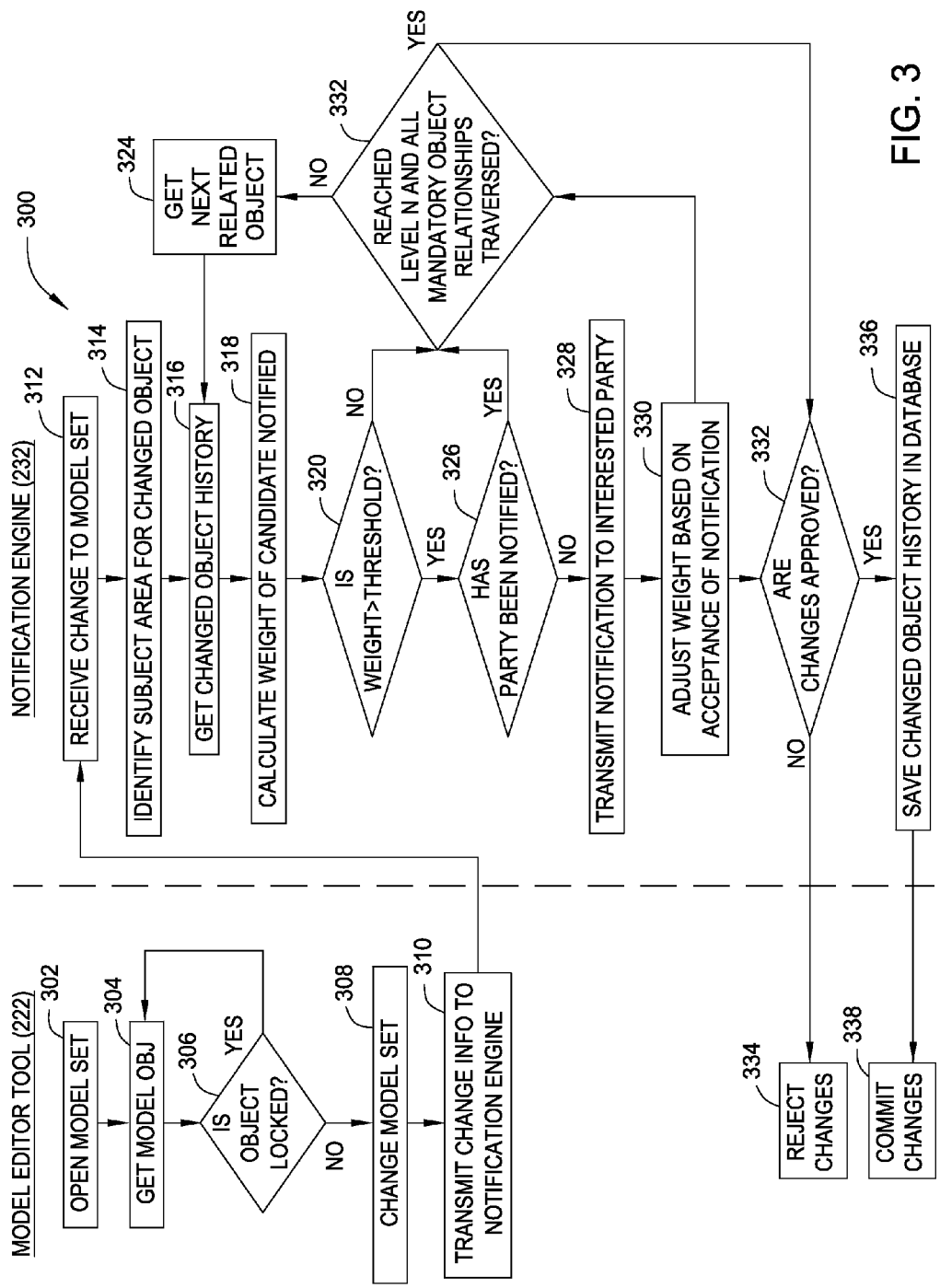
FIG. 3 is a flowchart depicting a method for notifying model developers based on a weighting system, according to one embodiment of the invention.

FIG. 3 is a flowchart depicting a method 300 for managing model development, according to one embodiment of the invention. As shown, the method 300 begins at step 302, where a model editor tool 222 of a client computing system 220 opens a model set having a plurality of model objects. At step 304, the model editor tool 222 retrieves one of the plurality of model objects for modification, for example, from a source control repository 236. At step 306, the model editor tool 222 determines whether the model object has been "locked" by another user and prevented from being concurrently modified. If so, the model editor tool 222 loops back to step 304 to continue to attempt to retrieve the model object. If the model object is not locked, the model editor tool 222 continues to step 308, where the model editor tool 222 modifies one or more model elements in the opened model set. The modification to the model set may include added or removed model elements, added or removed relationships between model elements, and other suitable changes to the model set.

At step 310, the model editor tool 222 transmits the modification to the notification engine 232 to notify one or more users of the pending change. The model editor tool 222 may transmit the modification as a delta, or "diff", between the retrieved model object or may be the entire updated model object. In one embodiment, the model editor tool 222 may transmit the modification to the notification engine 232 via a source control application 230, as described above. In another embodiment, the model editor tool 222 may transmit the modification directly to the notification engine 232 upon a local save operation in a local workspace by the model editor tool 222. The local save operation may be expressly performed by a user of the client computing system 220 or may be automatically performed by a periodic save function of the model editor tool 222.

At step 312, the notification engine 232 receives the modification to the model set from the model editor tool 222. The modification may include metadata information for processing the change, such as an identifier of the changed model object, an identifier of a user responsible for the modification.

At step 314, the notification engine 232 identifies a subject area for the changed model object that includes a plurality of model objects related to the changed model object or otherwise are affected by the modification. The notification engine 232 may utilize the identifier for the changed model object and one or more relationships 240 describing inter-model dependencies. The notification engine 232 identifies one or more related model elements by traversing, from the changed model object, other model elements via the model relationships. Starting from the changed model object, the notification engine 232 traverses the model set by following the one or more relationships 240 in an iterative manner. Each traversal of a relationship away from the changed model object may be represented as a level. The notification engine 232 may maintain a level counter that indicates how many relationships have been traversed, i.e., how closely related a traversed model object is to the changed model object.

For each traversed model object, at step 316, the notification engine 232 retrieves object history for the changed object to determine users to be notified of the changed model element. Each user having a relationship to any object traversed in the model may be considered for notification. As such, the notification engine 232 identifies, for each related model element identified at step 314, one or more interested users having a past interaction with the identified related model element. As described above, the notification engine 232 may utilize the object history 242 and the relationships 240 to determine candidate notified users that have previously modified the changed object itself or have previously modified objects that may be affected by the pending modification by dint of inter-model dependencies between the model objects. The notification engine 232 retrieves relationships between the candidate notified users and affected model object from the database.

At step 318, the notification engine 232 calculates a weight of the relationship between the candidate notified users and the changed model object based on the object history 242. In one embodiment, the notification engine 232 determines, for each interested user, a weighted relationship between the interested user and the changed model object based on the past interaction with the identified related model element and based on the model relationship between the identified related model element and the changed model element. The weight of a relationship based on a user's prior activity with a traversed object may be predetermined and may be retrieved from the database. The notification engine 232 may adjust the weight of the relationship based on the levels of traversal between the affected model object and the modified model object, as provided by the level counter. For example, the notification engine 232 may downgrade the weight of a relationship if the traversed model object is remotely related to the modified model object.

At step 320, the notification engine 232 determines whether the calculated weight surpasses a threshold value indicating a minimum level of interest that a candidate notified user must have before the user is notified of the modification.

If it is determined at step 320 that the calculated weight exceeds the threshold value, then the user is deemed an "interested party" and the method advances to step 326, described below; otherwise, the method 300 proceeds to step 322, where the notification engine 232 determines whether any candidate notified users and/or user relationships should be analyzed as per the weighting mechanism described herein. In one embodiment, the notification engine 232 may determine whether all inter-model relationships have been traversed and analyzed based on a level limit (described as "level N" in FIG. 3).

If it is determined at step 322 that all necessary inter-model relationships have not been exhausted for analysis, then at step 324, the notification engines retrieves a next related model object identified in step 314, and method 300 returns back to step 316; otherwise, if it is determined that all necessary inter-model relationships have been exhausted for analysis, the method 300 proceeds to step 332, described below.

At step 326, the notification engine 232 determines whether the interested party has already been notified, for example, by dint of another relationship with the modified object. If it is determined at step 326 that the interested party has already been notified, the method 300 proceeds to step 322, described above, e.g., the notification engine 232 may return back to step 316 via steps 322 and 324 to retrieve a next related object; otherwise, if it is determined at step 326 that the user has not been notified, the method 300 proceeds to step 328.

At step 328, the notification engine 232 transmits a notification to the interested party according to embodiments of the invention provided herein. In the embodiment depicted in FIG. 3, the notification includes notice that the change to the model set must be approved. The notification engine 232 receives one or more feedback messages (not shown) from the interested party in response to the notification. The feedback messages include an acceptance by the interested party of the notification, such as an acknowledgement message or a receipt confirmation, and an approval by the interested party of the change to the model set.

At step 330, the notification engine 232 adjusts the weight of the present relationship between the interested party and the affected model object based on acceptance of the notification. The notification engine 232 may increase the weight of the relationship if the notification is accepted by the interested party or decrease the weight of the relationship if the notification is ignored by the interested party.

At step 332, the notification engine 232 determines whether the changes to the model set have been approved by the interested party, for example, by determining whether any approval messages have been received by the notification engine 232 in response to the notification transmitted at step 328.

If it is determined at step 332 that the changes to the model set have not been approved, the method 300 proceeds to step 334, wherein the model editor tool 222 rejects the changes to the model set. If it is determined at step 332 that the changes to the model set have been approved, at step 336, the notification engine 232 saves the changed object history to the database, for example, in the object history 242, so that the notification engine 232 may continue to track interactions between the users and the model elements.

At step 338, the model editor tool 222 receives an indication that the changes have been approved and proceeds to commit the changes to the model set to the source control system.

FIGS. 4A, 4B, 4C, 4D, and 4E illustrate an incremental development of an object model 400A, 400B, 400C, 400D, 400E (identified collectively as 400) and a resultant mapping between model elements and users, according to one embodiment of the invention.

In this particular example, a user 408 (identified as "User 1") may create a new model 400A having a plurality of unrelated objects 402, 404, 406 (identified as Object 1, Object 2, and Object 3). The user 408 commits the new model 400A into a source control system, such as the source control application 230. The notification engine 232 recognizes that a new model 400A has been added to the source control system by User 1 and recognizes that User 1 would be interested in all changes to the elements of this model. As such, the notification engine 232 records that the new model has been created by User 1 in an object history 242. The notification engine 232 further records the relationships that maps User 1, the model 400 and model objects 402, 404, 406, and whether the model objects 402, 404, 406 are related (in this case, they are not) into the database. As shown in FIG. 4A, the User 1 and model objects 402, 404, 406 are depicted in a node-leaf manner to represent the relationships between them.

As shown in FIG. 4B, a second user 412 (identified as User 2) explicitly requests to be notified of any changes to Object 2 of the model 400. Accordingly, the notification engine 232 records this relationship into the database as an express "subscriber" relationship. The relationship between User 2 and Object 2 is shown in FIG. 4B as a node-leaf manner. As shown, Object 2 now includes User 1 and User 2 as interested parties to be notified of changes to Object 2.

As depicted in FIG. 4C, a third user 416 (identified as User 3) checks out a copy of the model 400 from the source control system and creates a new unrelated object 414 (identified as Object 4). User 3 checks in the changed model into the source control system. As with the creation of model objects 402, 404, 406, the notification engine 232 recognizes the creation of Object 4 and records a linkage between the newly created Object 4 and User 3. FIG. 4C illustrates the relationship between User 3 and Object 4 as a node-leaf manner.

As depicted in FIG. 4D, a User 3 again checks out from the source control system the model 400 and makes a modification to Object 2, for example, by changing an attribute or metadata of Object 2, and checks in the changed Object 2 back into the source control system. The notification engine 232 then detects the change to Object 2 and determines that User 1 and User 2 should be notified of the change, as per their relationship to Object 2, as shown in FIG. 4D. Further, the notification engine 232 may determine that User 3 modified Object 2 and recognize that User 3 may now be the most interested party for changes to Object 2, as shown by the addition of User 3 under Object 2 in FIG. 4D.

As depicted in FIG. 4E, a fourth user 422 (identified as User 4) is assigned a role as area owner of the model 400. The notification engine 232 recognizes that the role of area owner and records that User 4 is interested in all changes to all model objects 402, 404, 406, 414, as depicted by the dotted box 420.

As described above, as the model is developed, the notification engine 232 may record the modifications and relationships between modified model and the users making the modifications in a database. FIG. 5 illustrates exemplary database records tracking object history and relationships between model elements and users, according to one embodiment of the invention. The database records illustrated in FIG. 5 are one example of database records for object history and relationship that may result from the particular example in FIGS. 4A-4E.

FIG. 5 illustrates a database set 500 which includes a listing of modifications and changes made to the model 400. The database set 500 includes a plurality of data records 512 and columns. In the embodiment shown, the columns include an actor column 502, an action 504, a changed column 506, changed datetime 508, and a revision changeset column 510. The actor column 502 identifies a user responsible for the modification. The action column 504 describes the modification made. The action column 504 may distinguish between "create" and "modify" actions so that both actions may be given separate weight. The changed column 506 identifies the model element modified. The changed datetime column 508 provides date and time information for the modification. The revision changeset column 510 associates each change record to a corresponding revision from the source control system having the checked-in change.

As shown, the database set 500 includes a data record 512-1 representing the creation of Model A by User 1.

Similarly, data records 512-2, 512-3, 512-4 represent the creation of Object 1, Object 2, and Object 3 as described above. As Model A, Object 1, Object 2, and Object 3 were checked into the source control system together, the data records 512-1, 512-2, 512-3, 512-4 have the same changed datetime and revision changeset.

FIG. 5 also illustrates a database set 550 which represents the relationships between users and model elements resultant from the example in FIG. 4E. The database set 550 includes a plurality of data records 534 and columns. In the embodiment shown, the columns include a user column 522, a model element column 524, a role column 526, a relationship datetime 528, and a weight value 530.

The user column 522 and a model element column 524 identify the user and the model element that are related, respectively. For example, the user column 522 includes, by way of example, records of User 1, User 2, User 3, and User 4. In the example shown, User 3 has two distinct relationships with the model 400 that include a first relationship 534-4 with Object 4 for having created Object 4 and a second relationship 534-3 with Object 2 for having made an edit to Object 2. The role column 526 may provide a classification of the relationship between the user 522 and the model element 524. By way of example, the role column 526 includes values such as "Creator", "Subscriber", "Editor", "Creator", and "Area Owner." The relationship datetime column 528 represents date and time information for the creation of the relationship 534 and may be extended to include date and time information for the last change to the relationship 534. Finally, the weight column 530 represents a level of relevancy between the user 522 and the model element 524 in the relationship 534. While the weight column 530 is implemented as a numerical decimal value, it is contemplated other suitable numerical and ranking systems may be utilized.

While the foregoing is directed to embodiments of the present invention, other and further embodiments of the invention may be devised without departing from the basic scope thereof, and the scope thereof is determined by the claims that follow.

What is claimed is:

1. A computer program product for managing development of a model set, comprising:
a non-transitory computer-readable storage medium having computer-readable program code embodied therewith, the computer-readable program code comprising:
computer-readable program code configured to, responsive to receiving a change made by a first party to a changed model element from a model editor tool, query an object history database to identify a plurality of candidate parties having one or more past interactions with a related model element affected by the change to the changed model element, the related model element being determined according to model relationships of the model set stored in the object history database;
computer-readable program code configured to generate a data model for determining relationships between the plurality of candidate parties and model elements, comprising assigning, for each candidate party, a numerical weight value representing a relevancy of the changed model element to the candidate party, based on an initial level of interest to the related model element when the candidate party first interacted with the related model element and based on an amount of time elapsed since the candidate party last interacted with the related model element;

computer-readable program code configured to generate a change notification indicating the change to the changed model element and the first party making the change, wherein the change notification further comprises a description of how the related model element is affected by the change to the changed model elements;

computer-readable program code configured to selectively transmit, by operation of one or more computer processors, the change notification to each of two or more parties of the plurality of candidate parties via a data communication network, responsive to determining that each of the two or more parties have a corresponding numerical weight value within the data model that exceeds a threshold value; and computer-readable program code configured to dynamically update information within the data model indicating a relevancy of the changed model element to a second party of the two or more parties, by modifying the numerical weight value for the second party in a manner dynamically determined based on a response of the second party to the transmitted change notification.

2. The computer program product of claim 1, wherein the computer-readable program code further comprises:

computer-readable program code to store change information associated with the changed model element in an object history log, wherein the change information comprises a source of the changed model element and datetime information of the change information.

3. The computer-readable program code of claim 1, wherein at least one related model element comprises a model element previously changed by a corresponding candidate party; and wherein the numerical weight value between the corresponding candidate party and the changed model element comprises a weight value calculated based on a model relationship between the changed model element and the previously changed model element.

4. The computer-readable program code of claim 1, wherein the computer-readable program code further comprises:

computer-readable program code to decrease the numerical weight value between the changed model element and a first candidate party, the first candidate party having modified the changed model element prior to a party that changed the changed model element.

5. The computer program product of claim 1, wherein the past interaction with the related model element comprises: a subscription request to be notified of changes to the related model element.

6. The computer program product of claim 1, wherein the change notification comprises a description of the change and the numerical weight value, and wherein the change notification is selected from at least one of an e-mail message and a real-time alert message.

7. The computer program product of claim 1, wherein the computer-readable program code further comprises:

computer-readable program code configured to receive a feedback message from at least one of the candidate parties indicating approval of the changed model element;

computer-readable program code configured to, responsive to receiving approval of the changed model element, submit change information associated with the changed model element to a source control system.

8. The computer program product of claim 1, wherein the computer-readable program code further comprises:

computer-readable program code configured to generate a feedback notification for a party that modified the changed model element responsive to determining the changed model element affects the related model element.

9. The computer program product of claim 1, wherein computer-readable program code configured to calculate the numerical weight value based on a number of levels comprising the model relationship between the changed model element and the related model element and based on an amount of time elapsed since the past interaction of the candidate party with the related model element.

10. The computer program product of claim 1, wherein the computer-readable program code configured to identify the one or more candidate parties comprises:

computer-readable program code configured to identify one or more candidate parties having a past interaction with a related version of the corresponding related model element.

11. A system for managing development of a model set, comprising:

one or more computer processors;

a memory containing a program, which when executed by the one or more computer processors is configured to perform an operation comprising:

responsive to receiving a change made by a first party to a changed model element from a model editor tool, querying an object history database to identify a plurality of candidate parties having one or more past interactions with a related model element affected by the change to the changed model element, the related model element being determined according to model relationships of the model set stored in the object history database;

generating a data model for determining relationships between the plurality of candidate parties and model elements, comprising assigning, for each candidate party, a numerical weight value representing a relevancy of the changed model element to the candidate party, based on an initial level of interest to the related model element when the candidate party first interacted with the related model element and based on an amount of time elapsed since the candidate party last interacted with the related model element;

generating a change notification indicating the change to the changed model element and the first party making the change, wherein the change notification further comprises a description of how the related model element is affected by the change to the changed model elements;

selectively transmitting, by operation of the one or more computer processors, the change notification to each of two or more parties of the plurality of candidate parties via a data communication network, responsive to determining that each of the two or more parties have a corresponding numerical weight value within the data model that exceeds a threshold value; and dynamically updating information within the data model indicating a relevancy of the changed model element to a second party of the two or more parties, by modifying the numerical weight value for the second party in a manner dynamically determined based on a response of the second party to the transmitted change notification.

12. The computer program product of claim 1, further comprising:

computer-readable program code configured to modify the numerical weight value between at least one of the candidate parties and the changed model element based on acceptance of the change notification.

13. The computer program product of claim 12, wherein the computer-readable program code configured to modify the weighted relationship of at least one of the candidate parties based on acceptance of the change notification further comprises:

computer-readable program code configured to increase the numerical weight value between the at least one of the candidate parties and the changed model element responsive to acceptance of the change notification;

computer-readable program code configured to decrease the numerical weight value between the at least one of the candidate parties and the changed model element responsive to acceptance of the change notification.

14. The computer program product of claim 1, wherein modifying the numerical weight value for the second party in a manner dynamically determined based on a response of the second party to the transmitted change notification comprises:

increasing the numerical weight value when the second party sends a feedback message in response to the received change notification; and decreasing the numerical weight value when the second party ignores the received change notification.

15. The system of claim 1, wherein modifying the numerical weight value for the second party in a manner dynamically determined based on a response of the second party to the transmitted change notification comprises:

increasing the numerical weight value when the second party sends a feedback message in response to the received change notification; and decreasing the numerical weight value when the second party ignores the received change notification.

* * * * *